(12) United States Patent
Daios

(10) Patent No.: US 11,739,811 B2
(45) Date of Patent: Aug. 29, 2023

(54) TYING AND STABILIZATION SYSTEM OF PLASTIC FILM COVERING FOR LINEAR CULTIVATIONS

(71) Applicant: ASTERIOS DAIOS, Naoussa (GR)

(72) Inventor: Dimitrios Daios, Naoussa (GR)

(73) Assignee: Asterios DAIOS, Naoussa (GR)

( * ) Notice: Subject to any disclaimer, the term of this patent is extended or adjusted under 35 U.S.C. 154(b) by 471 days.

(21) Appl. No.: 16/787,393

(22) Filed: Feb. 11, 2020

(65) Prior Publication Data

US 2020/0323152 A1 Oct. 15, 2020

(30) Foreign Application Priority Data

Apr. 12, 2019 (EP) ..................................... 19168867

(51) Int. Cl.
| | | |
|---|---|---|
| *F16G 11/00* | (2006.01) | |
| *F16B 5/06* | (2006.01) | |
| *F16G 5/06* | (2006.01) | |
| *F16G 11/14* | (2006.01) | |

(52) U.S. Cl.
CPC ............ *F16G 11/00* (2013.01); *F16B 5/0692* (2013.01); *F16G 11/143* (2013.01)

(58) Field of Classification Search
CPC ...... F16G 11/00; F16G 11/143; F16B 5/0692; F16B 5/12; F16B 11/006; F16B 45/00; A01G 13/0206
See application file for complete search history.

(56) References Cited

U.S. PATENT DOCUMENTS

| | | | |
|---|---|---|---|
| 3,751,772 A | | 8/1973 | Grandjanny |
| 4,355,444 A | * | 10/1982 | Haney ................... F16G 11/143 |
| | | | 24/130 |
| 4,662,038 A | | 5/1987 | Walker |
| 4,682,642 A | | 7/1987 | Hogshead, III et al. |

(Continued)

FOREIGN PATENT DOCUMENTS

| | | |
|---|---|---|
| AT | 398816 B | 2/1995 |
| DE | 4222009 A1 | 1/1994 |

(Continued)

OTHER PUBLICATIONS

Extended European Search Report for European Application No. 19168867.0, dated Nov. 6, 2019.

*Primary Examiner* — David M Upchurch
(74) *Attorney, Agent, or Firm* — Jason H. Vick; Sheridan Ross, PC

(57) ABSTRACT

One exemplary aspect relates to a system for tying and stabilizing a plastic cover film for agricultural crops such as soft fruit covers. Cultivation in covered areas has been particularly developed in recent decades. The state of the art includes glass panes, greenhouses, and special plastic coverings for soft fruit. With the prior art, the placement, fastening and fixing of the plastic film is achieved with ropes or with elastic cords or with soft PVC tubing. However, the cost of binding the plastic film is significant as skilled staff and considerable amounts of man hours are required to tie the plastic film to the supporting structure. Tying the film, in most cases, is carried out by employing knots on simple eyelets or grommets, that the plastic films bear and, respectively, with knots on the wire ropes of the structure.

6 Claims, 9 Drawing Sheets

(56) References Cited

U.S. PATENT DOCUMENTS

| | | | | |
|---|---|---|---|---|
| 5,168,605 | A * | 12/1992 | Bartlett | F16G 11/143 24/519 |
| 5,240,305 | A * | 8/1993 | Trethewey | B60J 11/00 296/136.11 |
| 5,317,788 | A * | 6/1994 | Esposito | F16B 45/00 24/300 |
| 6,889,470 | B1 | 5/2005 | Hill | |
| 7,464,443 | B2 * | 12/2008 | Lopes Praca | F16G 11/103 24/129 R |
| 2006/0054070 | A1 * | 3/2006 | Lopes Praca | B63B 21/08 114/218 |
| 2009/0008394 | A1 | 1/2009 | Colarusso | |
| 2011/0092347 | A1 * | 4/2011 | Kassel | A63B 21/0552 482/121 |
| 2011/0224055 | A1 * | 9/2011 | Kassel | A63B 23/0355 482/121 |
| 2013/0026324 | A1 * | 1/2013 | Fischer | F16M 13/022 248/316.1 |
| 2013/0091673 | A1 * | 4/2013 | Raymond | F16G 11/106 24/265 R |
| 2013/0316876 | A1 * | 11/2013 | Publicover | A63B 5/11 482/27 |
| 2016/0310774 | A1 * | 10/2016 | Publicover | A63B 5/11 |

FOREIGN PATENT DOCUMENTS

| | | |
|---|---|---|
| EP | 0331810 A1 | 9/1989 |
| FR | 2281717 A1 | 3/1976 |
| FR | 2729536 A1 | 7/1996 |
| GR | 1002871 B | 3/1998 |
| WO | WO 2017/144923 A1 | 8/2017 |

* cited by examiner

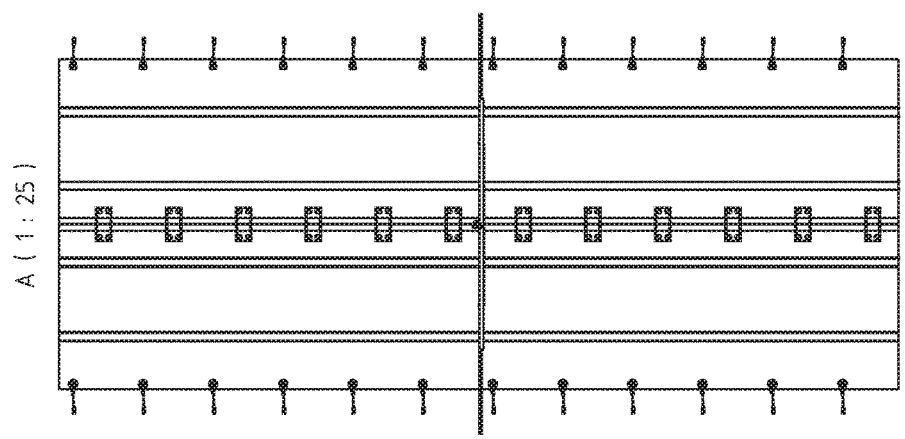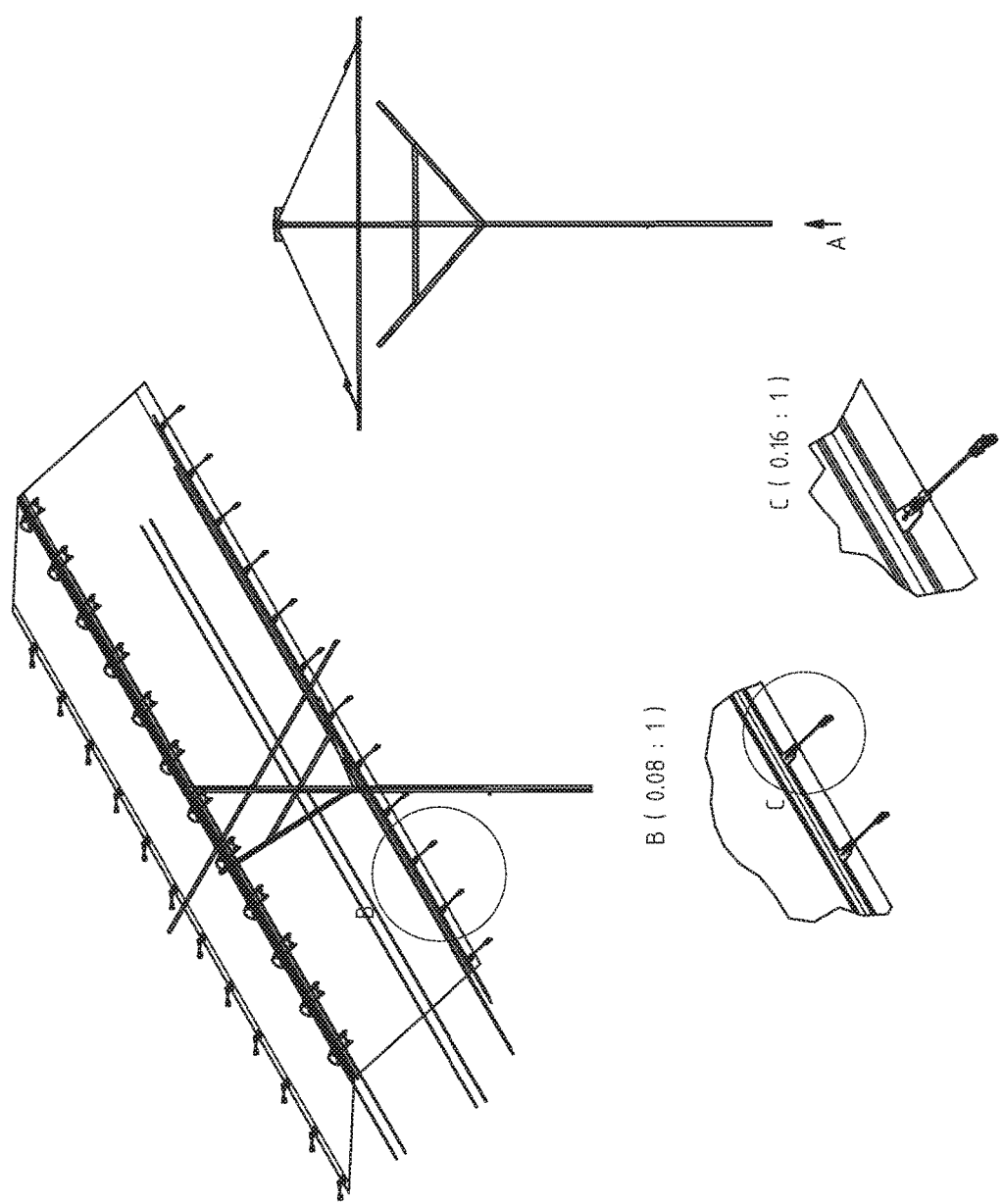
FIGURE 1

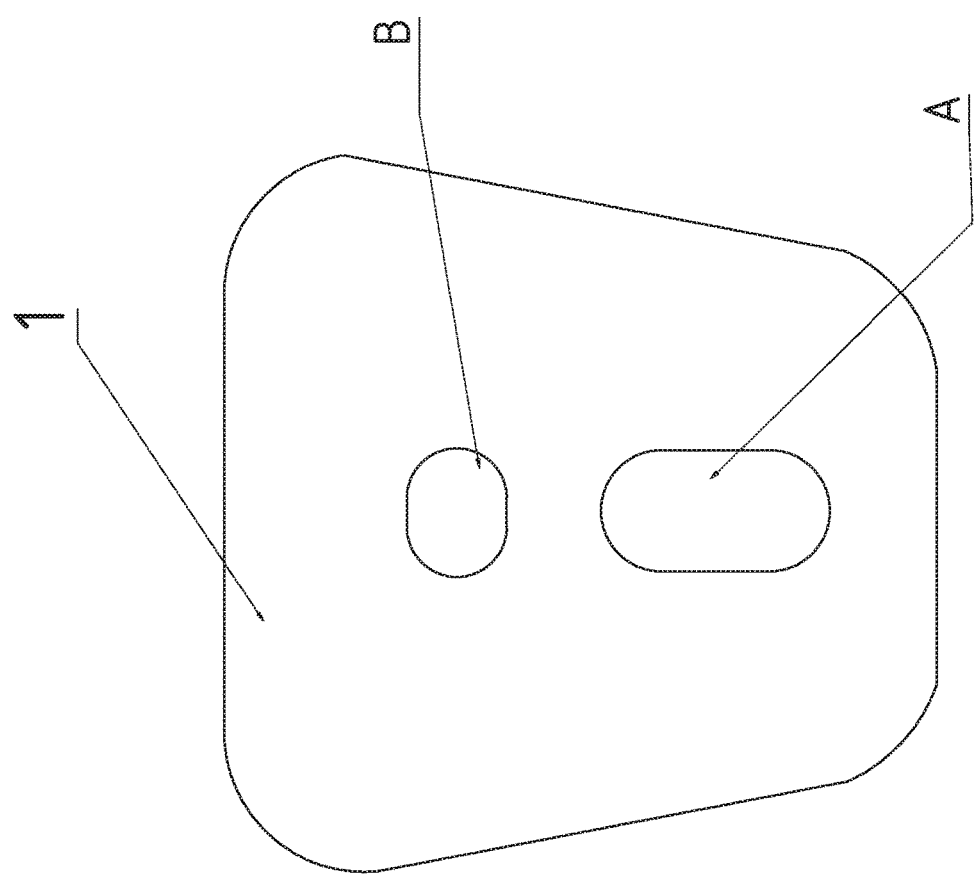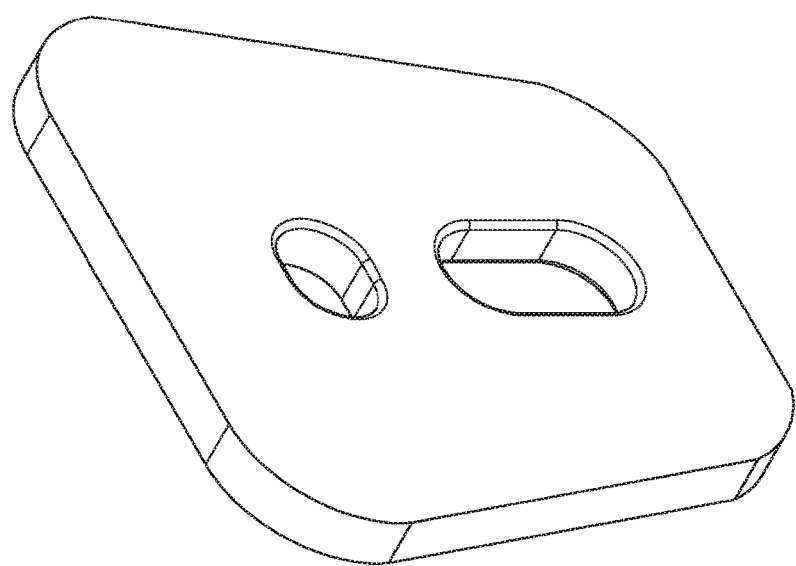
FIGURE 3

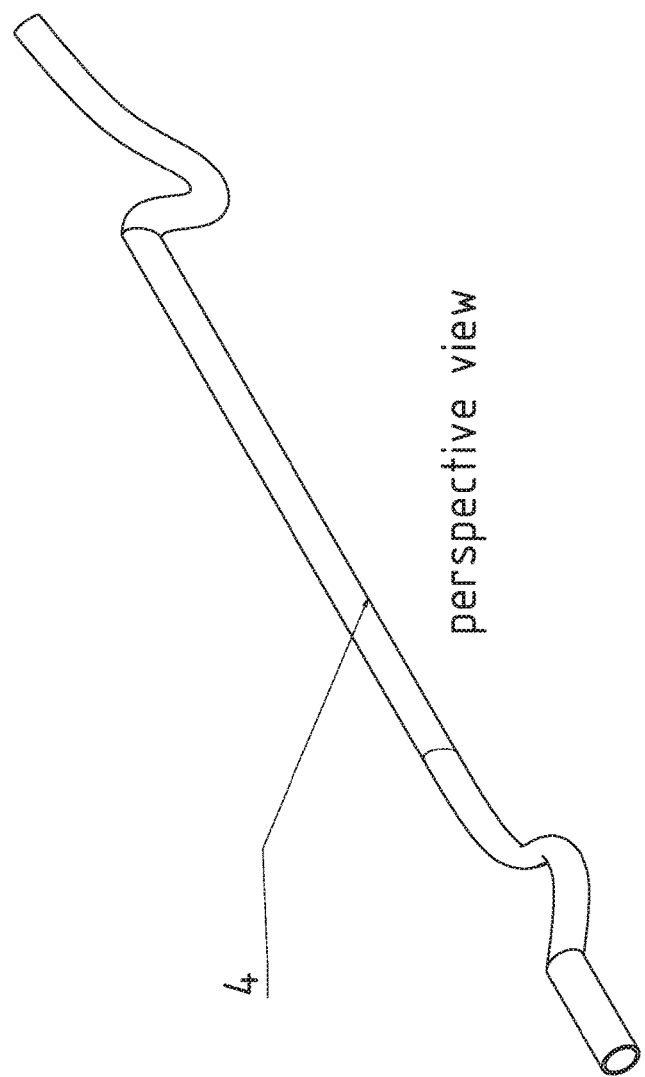
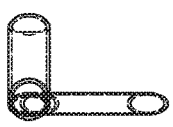
FIGURE 5

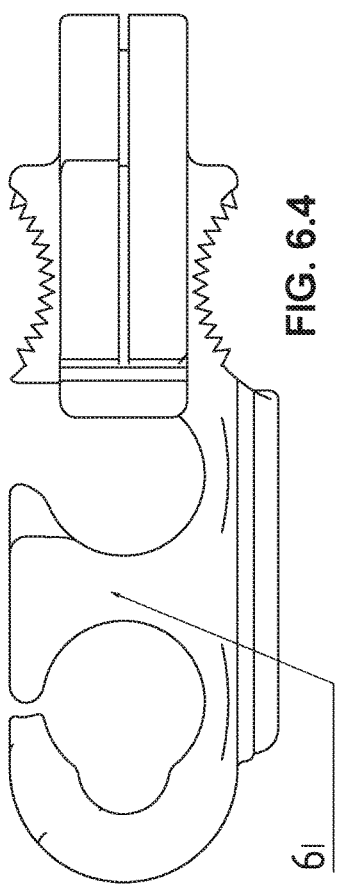
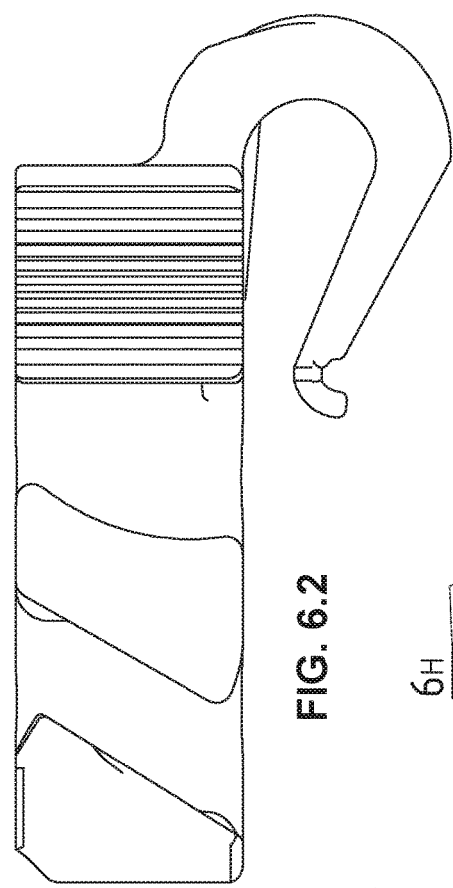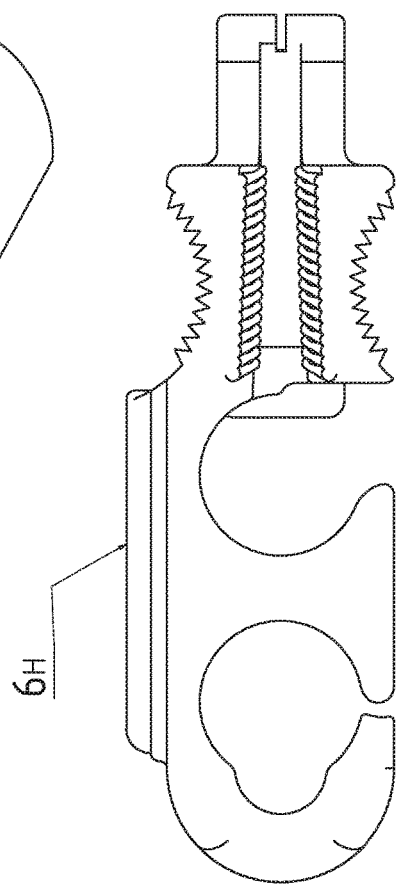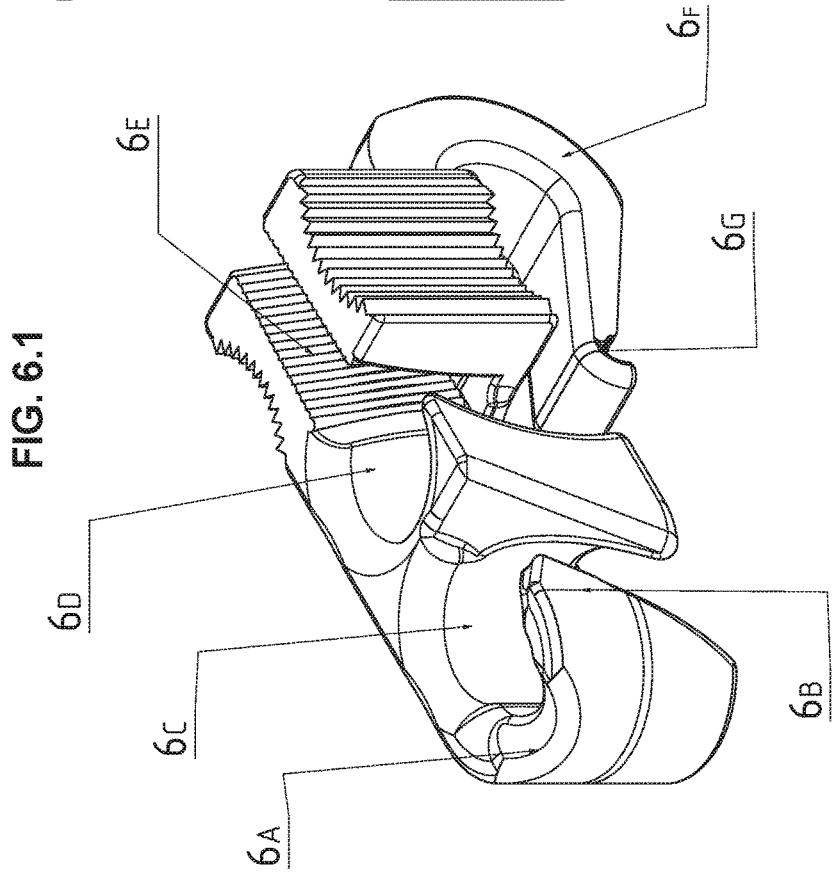
FIG. 6.4
FIG. 6.2
FIG. 6.3
FIG. 6.1

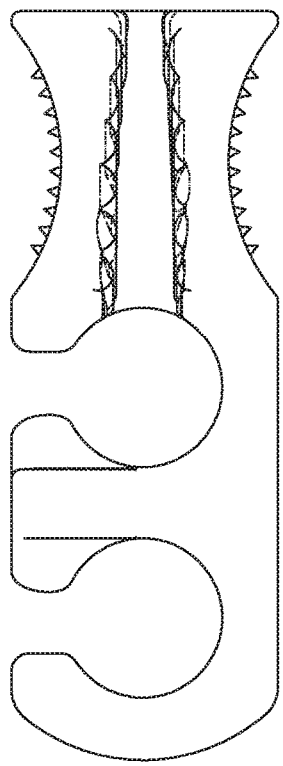
FIG. 9.1
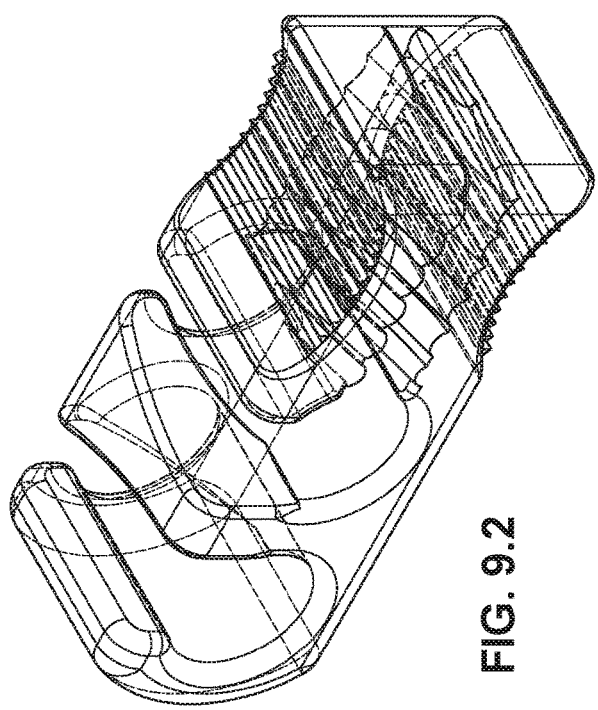
FIG. 9.2
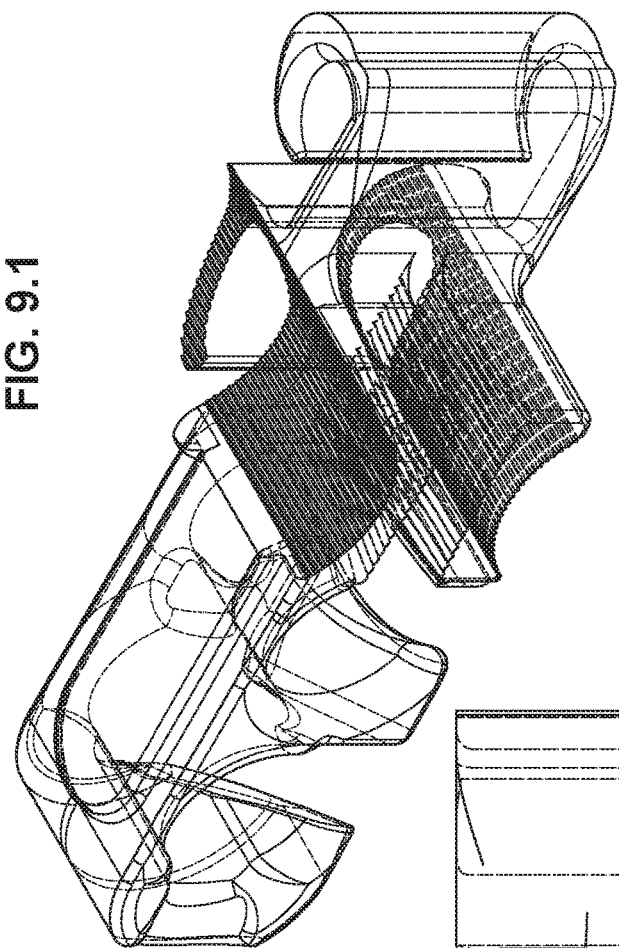
FIG. 9.3
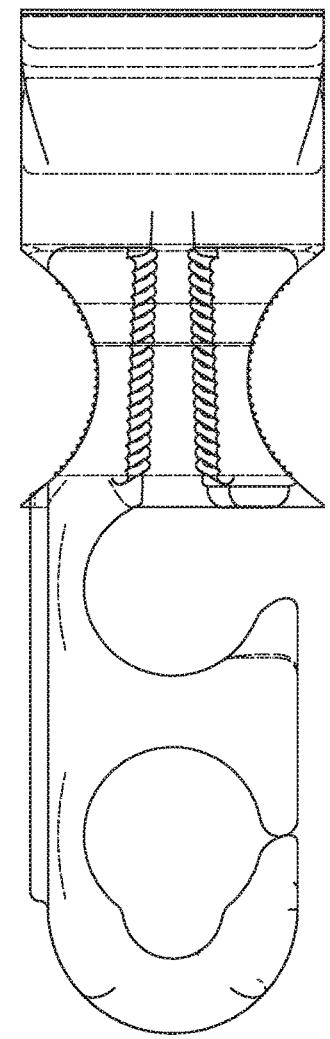
FIG. 9.4

TYING AND STABILIZATION SYSTEM OF PLASTIC FILM COVERING FOR LINEAR CULTIVATIONS

CROSS-REFERENCE TO RELATED APPLICATIONS

This application claims the benefit under 35 U.S.C. 119(a) to European Patent Application No. 19 168 867.0, filed Apr. 12, 2019, the disclosure of which is incorporated herein by reference in its entirety.

SUMMARY

The invention refers to a system for tying and stabilizing a plastic cover film for agricultural crops such as soft fruit covers according to the preamble of claim 1.

Cultivation in covered areas has been particularly developed in recent decades. The state of the art includes glass panes, greenhouses, and special plastic coverings for soft fruit. With the prior art, the placement, fastening and fixing of the plastic film is achieved with ropes or with elastic cords or with soft PVC tubing. However, the cost of binding the plastic film is significant as skilled staff and considerable amounts of man hours are required to tie the plastic film to the supporting structure. Tying the film, in most cases, is carried out by employing knots on simple eyelets or grommets, that the plastic films bear and, respectively, with knots on the wire ropes of the structure.

The distance between the eyelets is commonly between 50 to 100 cm. It is thus understood that to tie a plastic film of 10 m length, bearing in mind that the eyelets are spaced at 50 cm along the length of the film on each side, one would need 40 knots on each side, namely 80 knots including both sides of the plastic film. Furthermore, if for any reason one needs to realign the film on the structure, for example after strong winds cause the misplacement of said film, the process of untying the film and tying it again, is particularly time consuming and consequently entails high costs.

A second however, equally important complication is the fact that the service life of the plastic film is less than the service life of the tying material, namely the ropes, elastic cord or the small diameter tubes of soft material such as PVC. With time the knots become stiff and their internal friction is high hence not allowing them to be untied, hence they need to be cut and consequently the tying material is destroyed leading to significant financial burden. Bearing in mind that the service life of the plastic film is 3-4 years whereas the tying material's service life is 6-7 years it is understood that the grower assumes almost double the cost for the tying material.

A third complication is that it has been proven that most knots reduce the material's strength of which they have been produced and consequently when the tying material is tensioned it can fail at the point where the knot is performed. The reason for which this occurs is that the tying material, in the case of small diameter tubes or bungee cords, are produced linearly, by extruding the material through a die hence the mechanical properties are oriented towards the machine direction. When a knot is performed, the forces that are exerted on the knot are not at the machine direction anymore, instead they are exerted transversely and consequently the mechanical performance of the tying material is reduced by 20-30%.

Hence there is a need to develop a system to tie and stabilize the plastic film that confronts the aforementioned complications, namely to avoid the use of knots, to allow the reuse of the tying material at the end of the service life of the plastic film and to reduce the time needed to tie or realign the plastic film on the structure.

With the patent GR 1002871 a plastic film has been proposed that has specially formed eyelets on its sides along the length of the film, through which a special accessory that bears multiple hooks, which allow the tying and stabilization of the film on the wire ropes of the structure. While this patent addresses the complications mentioned above, there have been major practical problems at its use. The need to remove the plastic film for some months from the structure, to facilitate agronomical and cultivating works to take place, renders it imperative that the tying system facilitates the unhindered performance of such works. However, an accessory bearing multiple hooks in an environment where a multitude of wire ropes, branches and leaves exist, makes the performance of such works difficult hence the system has been only marginally used.

Other patents such as U.S. Pat. No. 4,662,038A, or the U.S. Pat. No. 4,682,642A, have been filed on the subject of tying and stabilising plastic films on structures, refer to formed profiles, through which one edge of the plastic film is inserted and with a second accessory or with a part of the lead bearing structure, the film is trapped and stabilised. However, these methods are employed in greenhouses and not on linear coverings of soft fruit where the structures are simpler and are based on the use or wire ropes and poles so that the overall cost of the structure is kept to a minimum.

With the U.S. Pat. No. 3,751,772A a device to terminate a bungee rope has been proposed so that it ends to a hook. However, while it could be a solution for many other cases, in the case of linear cultivations the need to adjust the length and the tension on the tying material, which is not provided by this specific patent.

With the patent US2009008394 A1 a system to tie the plastic film employing a loop and a special accessory that locks the loop has been proposed, however it wouldn't constitute an ideal solution because of the additional length of tying material needed to form the loop.

With the patent DE 42 22 009 A1 a plastic film has been proposed whose edges are folded and between the fold and the main plastic film, a rope or wire rope is inserted in the fold. Through a series of openings lengthways, hooks are employed to put tension on the film. This solution however, could not be employed for soft fruit cultivations as the height and the total surface of the film lead to the exertion of forces that the film could not bear without being damaged.

A similar solution to the above-mentioned patent has been proposed with the patent FR 2729536 A1. This solution had been developed for the cultivation of asparagus, and similarly to the above-mentioned case its use wouldn't be ideal for the cultivation of soft fruit due to the development of wind pressure on the film surface.

With the patent EP0331810A1 a system employing plastic profiles has been proposed to tie the film. Similarly, to the cases of U.S. Pat. Nos. 4,662,038A and 4,682,642A this solution is not ideal for soft fruits due to the complex structure needed in contrast to the very simple structures employed for soft fruit.

With the patent FR2281717 A1 the anti-frost protection of orchards and vineyards has been proposed with plastic film that bears eyelets without however addressing the issue of the easy tying/stabilising of the plastic film on the structure.

With the patent WO2017144923A1 of the current inventor, a plastic film has been proposed that bears formed sinusoidal plastic cords along its both edges lengthways, so that the forces distribution is optimized along the film.

However, this solution does not address in its entirety the easy tying/stabilizing the plastic film on the cultivation line.

It is an object of the present invention to provide a system that addresses the tying/stabilizing problem so that it facilitates the grower at the installation phase as well as the operational phase all along the removal of the plastic film at the end of the cultivation period.

The above object is solved by a system with the features of claim 1. Beneficial aspects are addressed by the sub-claims.

The system for tying and stabilizing the plastic film consists of four distinct parts, of which the first part is the subject of the state-of-the-art but functions as a whole with the addition of the following three additional parts (2, 3 & 4, FIG. 2) described below:

The first part (1) of the system (FIG. 2) is the specially shaped plastic eyelet (FIG. 3), which is on the plastic film and in particular along its edges with a repeatability of between 10-100 cm and preferably 50 cm. The special eyelets may be of any geometry and of any shape and have at least one hole (FIG. 3, A) through which the tying material passes (rope, elastic cord or preferably a small diameter tube of soft material such as PVC, silicone or the like). The hole may be circular, oval, triangular, or any other geometry. Respectively, if eyelet bears more than one holes, they may be at any point on said eyelet (FIG. 3, B), symmetrically or non-symmetrical placed between or among them, having the same size and shape or not. Preferably, however, the eyelet carries an oval shaped hole positioned along its central axis.

The second part of the system (FIG. 2, 2) is special accessory bearing a head and the main body in which there are formations to hold the third part of the system, the tying material, without the need to employ knots. The second part of the system is produced either by injection moulding or 3D printing. To achieve the restraint of the tying material, the special accessory has at least two retaining positions which may be slots or notches (FIG. 4, 4B, 4C) with a distance between the walls of the notch, smaller than the diameter (in the case of a circular cross-section (4, 4B, 4C) or the smallest width (in the case of non-circular cross-section) of the tying material. These notches can have parallel walls or the distance between said walls decreases as the depth of this notches increases so that the pressure exerted on the tying material increases. The notches can also have different geometry along their length (FIG. 4, 4B, 4C). Within the notches there may be friction-increasing formations such as bumps or strips (FIG. 4, 4B, 4C) to achieve greater friction between the wall of the specimen and the tying material. The two notches may have the same shape and the same bumps/strips or they can be completely different from each other but follow the same principle that the distance of the walls of each notch is less than the shorter distance of the cross-section of the tying material. Between the two notches and symmetrically in relation thereto, there is a formation which causes the tying material to bypass the imaginary straight line between the notches and form angles with respect to the notches. The formation of these angles increases the friction according to the relation $T2=T1 \cdot e^{\mu\beta}$ (Amontons equation) where T2 is the force exerted on the mooring material, T1 is the initial force before the change of direction which is exponentially influenced by the friction coefficient $\mu$, between of the materials in contact and the angle $\beta$ formed between the direction of change. From this equation we can see that the friction is in direct relation to the force exerted on the special piece. In order to facilitate the insertion of the tying material into the second part of the system, the latter has an open architecture on one side, allowing for the quick insertion of the tying material into the accessory in a single movement, forming a loop in the tying material, whose centre is tangent to point 4E (FIG. 4) and simultaneously pulling the two ends of the tying material, inserting it into the corresponding notches of the accessory.

The head may be of any shape such as, for example, spheroidal, conical, oblong, and of a size larger than the diameter of the hole that the eyelet bears (in the case of a circular hole configuration) or greater than the greater distance of the hole in the case of any other shape). In a particular case, the shape of the head could be the same as the shaped hole so that it enters the hole, and when rotated at 90 degrees to its final position, it does not allow the exit from the hole due to its geometry. It is obvious that in order for the head to exit from the formed hole, the head should again return to its original insertion position in the hole, adding further safety during the operation of the system.

The third part of the system (3) (FIG. 2) is the tying material (FIG. 5) which may be rope, elastic cord or preferably a small diameter tube for example 6 mm with walls of 1.5-2 mm. The third case is preferred as when the material is at an angle or when it is in the notches of the second part of the system, friction is developed both between the fastening material and the second part of the system, as well as between the inner walls of the tube, thus multiplying the holding force. The material is preferably viscoelastic so as to automatically adapt its mechanical behaviour to the level of forces exerted thereon. In cases of strong winds, the material experiences greater forces and becomes more rigid, while at lower air velocities and corresponding pressures it is softer.

The fourth part of the system (4) (FIG. 2) is a specially shaped accessory (FIG. 6) which is designed in such a manner that it causes the tying material passing through it, originally from the opening 6C, tangent to the point 6A, and then changes direction and tangents to point 6I, to change direction again by passing through 6D essentially increasing the holding force (Amontons equation) and entering the back of the accessory into the notch (FIG. 6, 6E) to hold the tying material. The system is attached to the wire rope with the hook 6F located at the back of the special accessory which may also have a special 6G configuration to facilitate the insertion of the wire into the hook. In a simpler version of the fourth part of the system (9.1 & 9.2, FIG. 9), the system is stabilized by placing a cable between the special piece and the tying material at the point 6I where the change of direction of the tying material occurs. The part may also feature a stiffener 6H at its closed side to improve its rigidity.

Aspects of the invention are directed toward:

A system for tying and stabilizing a plastic cover film for agricultural cultivations such as greenhouses and soft fruit covers, comprising a first part (1) that is adapted to be glued, heat-sealed or fused on a lengthway edge of the plastic cover film, wherein the first part (1) has a specially formed eyelet bearing at least one hole, characterized in that the system further comprises at least three additional distinct parts (2, 3, 4) which are in series and connected one to the next, wherein a second part (2) and a fourth part (4) of the system are produced by an injection moulding or 3D printing process, so that the second part (2) is securely connected to the first part (1), wherein the fourth part (4) is securely connectable to a wire rope and wherein the second part (2) and the fourth part (4) are connected with each other via a third part (3) of the system being an elastic cord.

Further aspects are characterized in a) that the second part (2) is a shaped accessory having a specially shaped head (4A) that enters or contacts the specially shaped hole of the first part (1) and shaped notches (4B, 4C) in which the third part (3) of the system enters from the side that has an open geometry and abuts at, at least one point spaced from the imaginary straight line that said notches (4B, 4C) form, and b) that the fourth part (4) through which the third part (3) of the system is inserted, has in particular an open geometry on its one side, allowing easy insertion of the third part (3) and contacts at, at least three points which form angles among them.

Further aspects are characterized in that the third part (3) of the system is a small calibre tube of plastic or elastic material which, when it enters the moulded notches (4B, 4C) and when the angle changes in the imaginary line of force exertion, it is deformed so as to increase the friction both between its walls and the respective sides of both the second part (2) and fourth part (4) into which it is placed, and between the inner walls of the small calibre tube to achieve greater overall friction.

Further aspects are characterized in that the second part (2) and the fourth part (4) are made of durable materials such as polymers or elastomers whose natural or treated surfaces have a high coefficient of friction, so as to increase the total friction between these two parts (2, 4) and the third part (3) passing through the second part (2) and the fourth part (4).

Further aspects are characterized in that the second part and the fourth part (4) are coated with elastic or elastomeric materials which further increase the friction between the second part (2) and the third part (3) and respectively between the third part (3) and the fourth part (4).

Further aspects are characterized in that the third part (3) is made of a viscoelastic material to automatically adapt its mechanical behaviour to the level of forces exerted on it.

BRIEF DESCRIPTION OF THE DRAWINGS

Further aspects, advantages, features and properties of the present invention will become apparent from the claims and the following description of preferred embodiments with reference to the drawings, in which:

FIG. 1 depicts partially the covering system on the supporting structure;

FIG. 3 depicts the first part of the system, the special eyelet on the plastic film;

FIG. 5 depicts the tying material that is shown as it would bent inside the second and fourth part respectively;

FIGS. 6.1-6.4 depict the fourth and final part of the system;

FIGS. 9.1-9.4 depict alternative versions of the fourth part of the system.

DETAILED DESCRIPTION

Figure 2B:
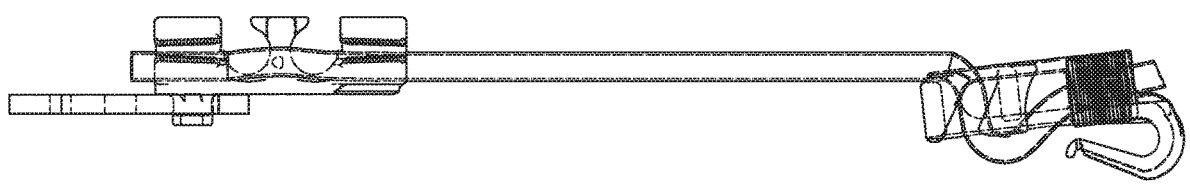
FIGS. 2A-2C depict the tying/stabilizing system proposed in its entirety.
Figure 2A:
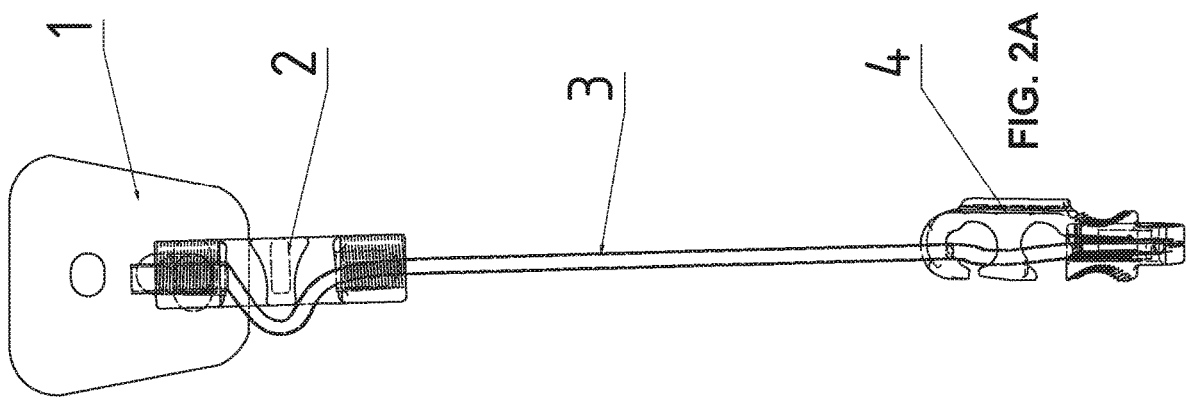
Figure 2C:
Figure 4:
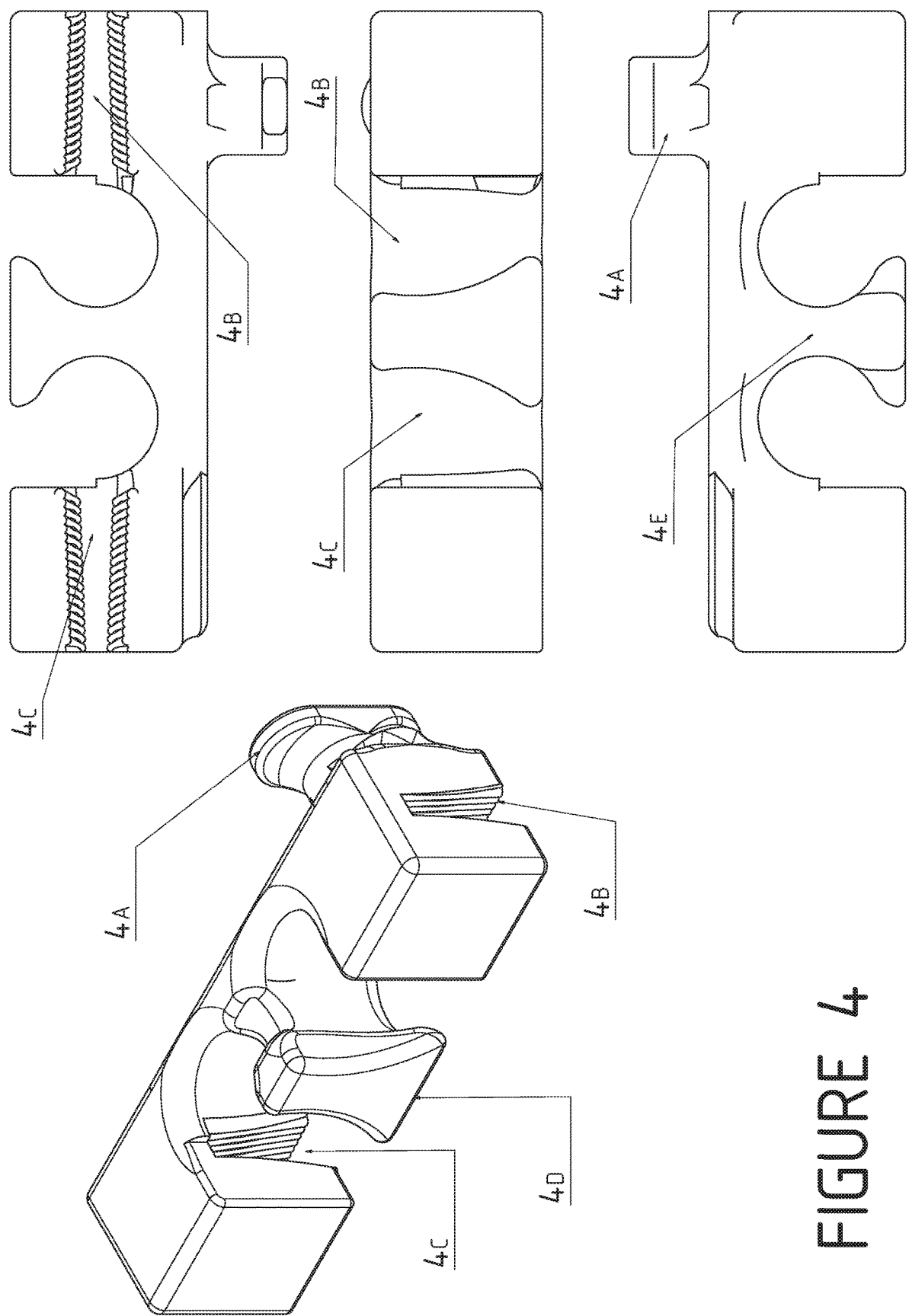
FIG. 4 depicts the second part of the system the special accessory between the eyelet (first part of the system) and the tying material (third part of the system)

According to the principal embodiment of the invention a plastic film (FIG. 1) is produced from a polyolefin (LDPE, LLDPE, EVA etc.) or a combination thereof. The plastic film can be of any length (L) and width (W). The plastic film may have been produced by any known process of blown film in a monolayer or a multilayer format, in order to have the desired thermal, optical and mechanical properties, then the special eyelets are created which constitute the first part of the system (1) (FIG. 2) which may be glued, heat-sealed or preferably fused on the plastic film. The second part of the system (2) (FIG. 2) is produced in a different phase either by the injection moulding method or by 3D printing. The third part of the system (3) (FIG. 2) is the cord or small diameter tube produced in another production phase in a continuous extrusion method, from a suitable material such as, for example, soft PVC, silicone or rubber material. The third part enters the notches of the second part, being folded in the third part by forming a conceivable loop, the centre of which contacts the point 4E (FIG. 4) and simultaneously pulling the two ends of the cord into the formed slots or notches 4B and 4C (FIG. 4). This operation makes it very fast and therefore cost effective, to insert the tying material to the second part of the system, while avoiding knots that reduce the tying material's strength. The free end of the tying material enters the fourth part of the system (4) (FIG. 2) in the openings 6C and 6D adjacent to the points 6A and 61 (FIG. 6) of the fourth part of the system, while one side of the accessory is as in the second part configured so that the third part of the system enters with great ease and high speed. The end of the third part enters the formed notch 6E of the fourth part of the system (FIG. 6). The whole of the three parts of the system (2, 3 & 4) enters the formed fastening position (1) (FIG. 2) with the head (4A, FIG. 4) of the second part of the system entering the formed attachment position (FIG. 3, A) which constitutes the first part of the system.

Figure 7:
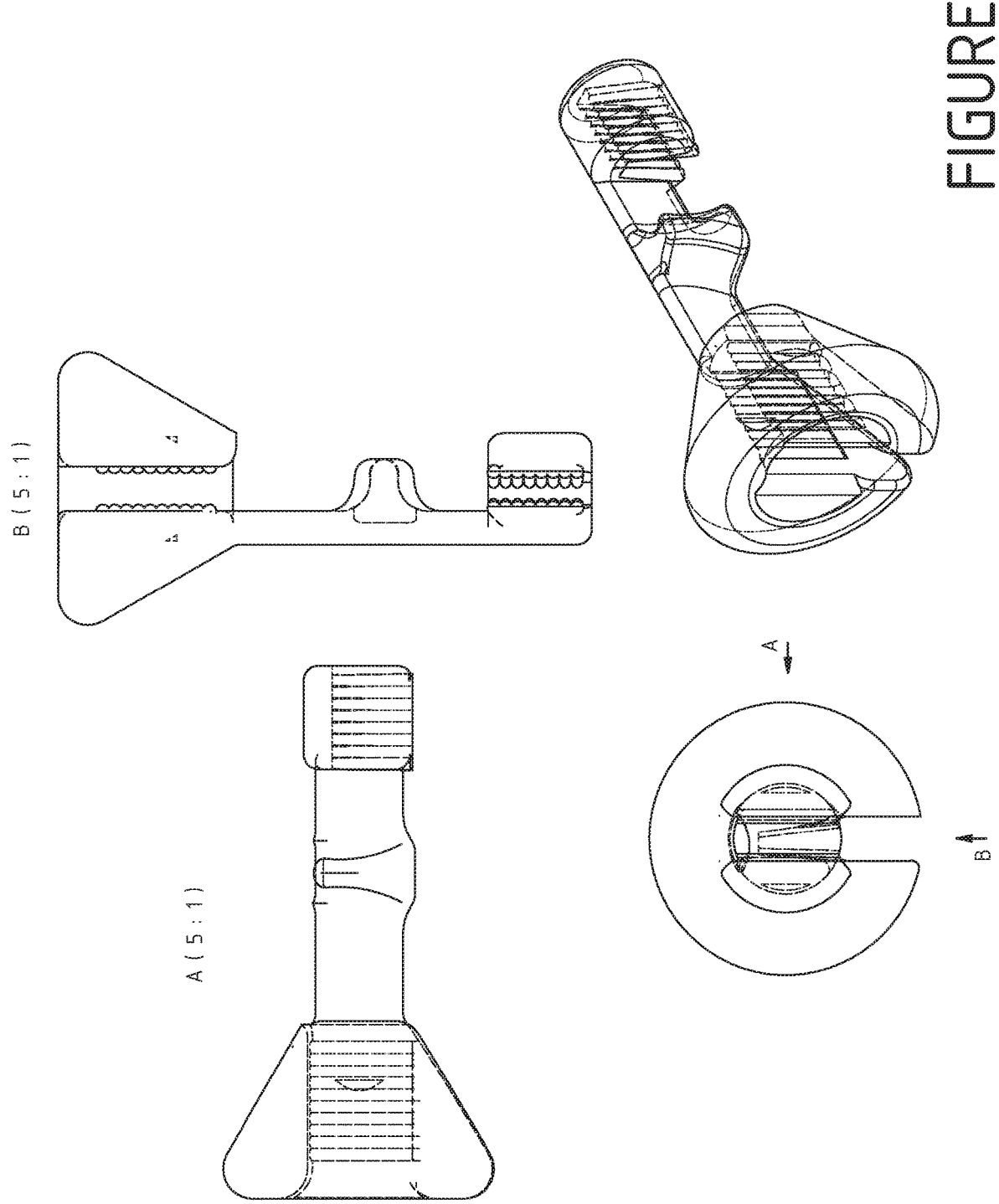
FIGS. 7 and 8 depict alternative versions of the second part of the system.
Figure 8:
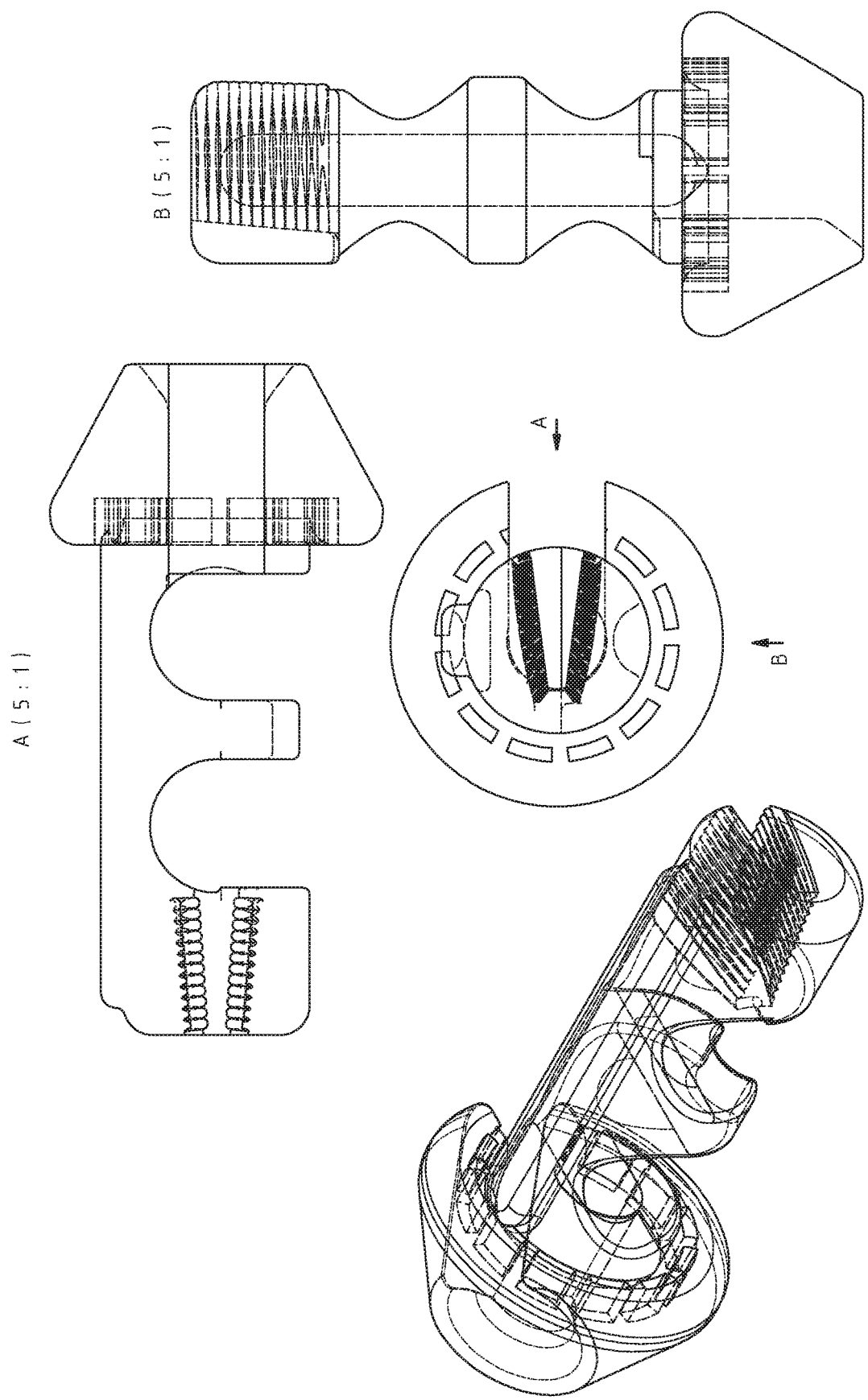

In a second embodiment of the invention the second part of the system, retaining the same way of inserting the third part of the system into its slots or notches, may have a different geometry (FIGS. 7 & 8). Also, the third part of the system may have different sections and cross sections. Also, the fourth part of the system may have a different geometry (FIG. 9) retaining however the features of having the notches, the change of direction to increase the exerted friction etc. It is obvious that the number of combinations of the four parts of the system that can occur is extremely large but most combinations can be equally effective.

In a third embodiment of the invention, the second part of the system may be a simple geometric shape such as a sphere, a cone, a rectangle, a square, a triangle having at least one hole or notch through which, one end of the third part of the system can be inserted and by making a free knot therein it does not allow the third part of the system to pass through the second part by pulling it in the direction of the third part that is inserted into the fourth part of the system.

The invention claimed is:

1. A system configured to tie and stabilize a plastic cover film for agricultural cultivations, comprising:
   a first part, a second part, a third part and a fourth part,
   the first part configured to be permanently glued, heat-sealed or fused on a lengthwise edge of the plastic cover film, wherein the first part has an eyelet having at least one hole configured for connection with the second part,
   the second part being an injection molded or 3D printed second part, and
   the fourth part being an injection molded or 3D printed fourth part, wherein the second part is securely connectable to the first part, and the fourth part configured to be securely connectable to a wire rope, and the second part and the fourth part are connected to each other via the third part, the third part being an elastic cord or connecting element, the second and the fourth part engaging the third part with a respective combination of frictional notches and openings into which the third part traverses.

2. The system according to claim 1, wherein the second part has a shaped head that enters or contacts the at least one hole of the first part and the frictional notches in which the third part of the system enters from a side that has an open geometry and abuts at, at least one point spaced from an imaginary straight line that said frictional notches form, and the fourth part, through which the third part of the system is inserted, has an open geometry on one side, allowing insertion of the third part and contacts at, at least three points thereof.

3. The system according to claim 2, wherein the third part of the system is a tube of plastic or elastic material which, when the third part enters the frictional notches and when an angle changes in the imaginary straight line of force exertion, the third part is deformed so as to increase friction both between the third part and respective sides of both the second part and fourth part into which the third part is placed, and between inner walls of the tube of plastic or elastic material to achieve greater overall friction.

4. The system according to claim 1, wherein the second part and the fourth part are made of durable materials including one or more of polymers or elastomers whose natural or treated surfaces have a coefficient of friction, so as to increase a total friction between the second part and the fourth part and the third part passing through the second part and the fourth part.

5. The system according to claim 1, wherein the second part and the fourth part are coated with elastic or elastomeric materials which further increase the friction between the second part and the third part, and respectively between the third part and the fourth part.

6. The system according to claim 1, wherein the third part is made of a viscoelastic material to automatically adapt mechanical behavior of the third part to a level of force exerted on the third part.

* * * * *